(12) United States Patent
Munoz (10) Patent No.: US 7,328,510 B2
(45) Date of Patent: Feb. 12, 2008

(54) ELBOW ROTATOR

(75) Inventor: Jairo Munoz, Iowa City, IA (US)

(73) Assignee: Met-Coil Systems, LLC, Westfield, MA (US)

( * ) Notice: Subject to any disclaimer, the term of this patent is extended or adjusted under 35 U.S.C. 154(b) by 408 days.

(21) Appl. No.: 10/744,279

(22) Filed: Dec. 23, 2003

(65) Prior Publication Data

US 2004/0158986 A1 Aug. 19, 2004

Related U.S. Application Data

(60) Provisional application No. 60/493,426, filed on Aug. 7, 2003, provisional application No. 60/436,097, filed on Dec. 23, 2002.

(51) Int. Cl.
*B21K 1/16* (2006.01)
*B21D 11/02* (2006.01)

(52) U.S. Cl. ............ 29/890.149; 29/33 K; 29/33 T; 72/295; 72/298; 72/305; 72/311; 72/369

(58) Field of Classification Search .......... 29/890.149, 29/564, 33 K, 33 D, 33 T; 72/176, 177, 72/295, 298, 299, 300, 305, 308, 310, 311, 72/312, 313, 367.1, 369
See application file for complete search history.

(56) References Cited

U.S. PATENT DOCUMENTS

| 606,785 | A | * | 7/1898 | Kemp | 72/295 |
|---|---|---|---|---|---|
| 2,534,429 | A | * | 12/1950 | Elliott | 72/295 |
| 3,490,137 | A | * | 1/1970 | Buck et al. | 29/437 |
| 3,670,553 | A | * | 6/1972 | Nothum et al. | 72/307 |
| 3,731,513 | A | * | 5/1973 | Kindermann et al. | 72/295 |
| 3,815,394 | A | * | 6/1974 | Walker | 72/55 |
| 3,861,184 | A | * | 1/1975 | Knudson | 72/30.1 |
| 3,979,809 | A | * | 9/1976 | Schneider | 29/890.149 |
| 4,210,090 | A | * | 7/1980 | Stubbings | 72/52 |
| 4,693,663 | A | | 9/1987 | Brenholt et al. | |
| 4,806,066 | A | | 2/1989 | Rhodes et al. | |
| 4,913,617 | A | * | 4/1990 | Nicholson | 414/729 |
| 4,921,393 | A | | 5/1990 | Andeen et al. | |
| 4,991,293 | A | * | 2/1991 | Bartholomew | 29/890.149 |
| 5,014,424 | A | * | 5/1991 | Takasugi | 29/890.149 |
| 5,090,101 | A | * | 2/1992 | Welty | 29/243.5 |
| 5,436,423 | A | * | 7/1995 | Welty | 219/121.39 |
| 5,836,194 | A | * | 11/1998 | Micouleau et al. | 72/307 |
| 6,105,227 | A | * | 8/2000 | Bota | 29/33 K |
| 6,363,764 | B1 | * | 4/2002 | Bota | 72/117 |
| 6,378,184 | B1 | * | 4/2002 | Bota | 29/33 K |
| 6,612,143 | B1 | * | 9/2003 | Butscher et al. | 72/21.4 |
| 6,732,558 | B2 | * | 5/2004 | Butscher et al. | 72/21.4 |
| 6,755,064 | B2 | * | 6/2004 | Butscher et al. | 72/21.4 |
| 6,860,132 | B2 | * | 3/2005 | Butscher et al. | 72/302 |

(Continued)

*Primary Examiner*—Essama Omgba
(74) *Attorney, Agent, or Firm*—McCormick, Paulding & Huber LLP (57) ABSTRACT

An elbow rotator apparatus for rotating an integrally formed section of an elbow workpiece includes a pair of gripping arms which are selectively positionable in a first position displaced from the elbow workpiece, and a second position in which the gripping arms are in contact with the integral section of the elbow workpiece. A rotary actuator is operatively connected to the gripping arms to selectively rotate the gripping arms by a predetermined amount when the gripping arms are in the second position.

19 Claims, 11 Drawing Sheets

U.S. PATENT DOCUMENTS

| | | | |
|---|---|---|---|
| 7,096,585 B2 * | 8/2006 | Bota | 29/890.145 |
| 2001/0029764 A1 * | 10/2001 | Price et al. | 72/295 |
| 2003/0005741 A1 * | 1/2003 | Sayler | 72/369 |
| 2005/0028337 A1 * | 2/2005 | Bota | 29/33 R |
| 2005/0072203 A1 * | 4/2005 | Rieck et al. | 72/177 |

* cited by examiner

ELBOW ROTATOR

CROSS REFERENCE TO RELATED APPLICATIONS

This application is entitled to the benefit of and incorporates by reference in their entireties essential subject matter disclosed in U.S. Provisional Application No. 60/436,097, filed Dec. 23, 2002 and U.S. Provisional Application No. 60/493,426, filed Aug. 7, 2003.

FIELD OF THE INVENTION

This invention relates, in general, to an elbow rotator apparatus for use with elbow sections of ductwork, and deals more particular with an elbow rotator apparatus that will automatically turn each section of an elbow duct to its proper orientation.

BACKGROUND OF THE INVENTION

Elbow sections of ductwork are typically formed as straight pieces of cylindrical ductwork prior to being manipulated into a finished elbow having a substantial bend attributed thereto. This manipulation has traditionally been accomplished by hand.

While the known hand manipulation of elbow workpieces is effective to a certain degree, such a process is manually difficult and time consuming, as well as oftentimes resulting in the formation of finished elbows having slightly non-uniform characteristics.

With the forgoing problems and concerns in mind, it is the general object of the present invention to provide an elbow rotator that will automatically rotate individual sections of an elbow workpiece to form the finished elbow.

SUMMARY OF THE INVENTION

It is an object of the present invention to provide an elbow rotator that will automatically turn each section of an elbow duct to their proper orientations.

It is another object of the present invention to provide an elbow rotator that will automatically turn each section of an elbow duct to their proper orientations while being incorporated into an elbow formation apparatus.

It is another object of the present invention to provide an elbow rotator that will automatically turn each section of an elbow duct to their proper orientations while serving as a stand alone apparatus.

It is another object of the present invention to provide an elbow rotator that will simultaneously rotate each integrally formed section of an elbow workpiece.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
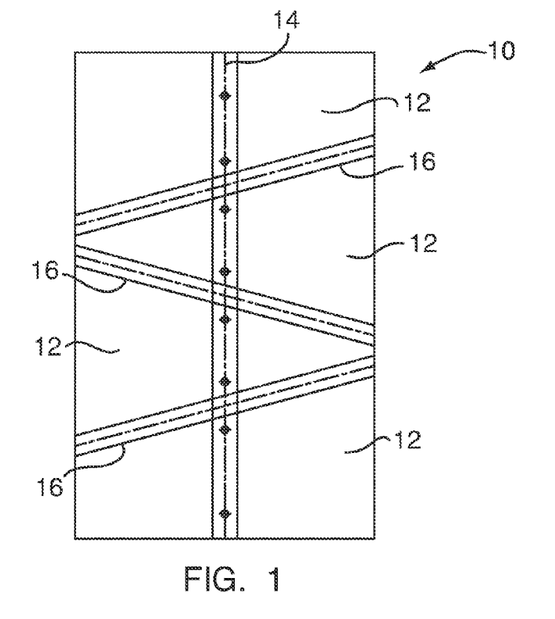
FIG. 1 illustrates a straight elbow section of ductwork, or elbow workpiece, having a plurality of integrally formed sections.

FIG. 1 illustrates a section of an elbow ductwork 10 prior to the elbow 10 being rotated into its final form. As can be seen in FIG. 1, the elbow 10 includes several sections 12 that have been formed by bending a sheet-metal workpiece, or the like, into a cylindrical shape about a common seam 14. Each of the sections 12 are separated from one another by an elbow joint 16 which has been cut and formed in the elbow 10 in a manner well known in the art. As will be appreciated, each of the section 12 of the elbow 10 shown in FIG. 1 must be turned with respect to one another in order to form the finished elbow 18, shown in FIG. 2.

Figure 2:
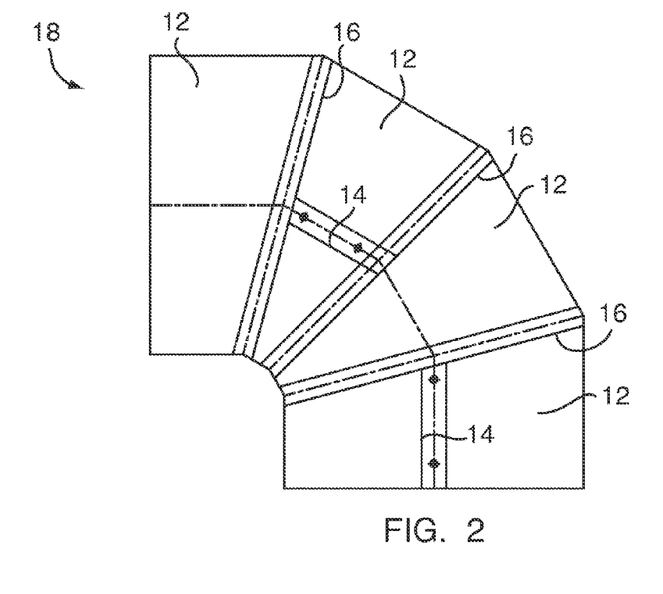
FIG. 2 illustrates a finished elbow section of ductwork.

As illustrated in FIG. 2, and in contrast to the elbow workpiece shown in FIG. 1, the seam 14 is no longer continuous along the length of the finished elbow 18 due to the individual rotation of the sections 12. During rotation, it is typical that each of the sections 12 experience an approximately 180° rotation with respect to adjacent sections in order to provide the 'bend', typically approximately 90°, to the finished elbow (as shown in FIG. 2). The present invention provides a heretofore unknown apparatus having the ability to automate the rotation of the individual sections 12 of an elbow workpiece.

It should be noted that while a rotation of approximately 180° has been described, other angles of rotation may also be accomplished without departing from the broader aspects of the present invention.

Figure 3:
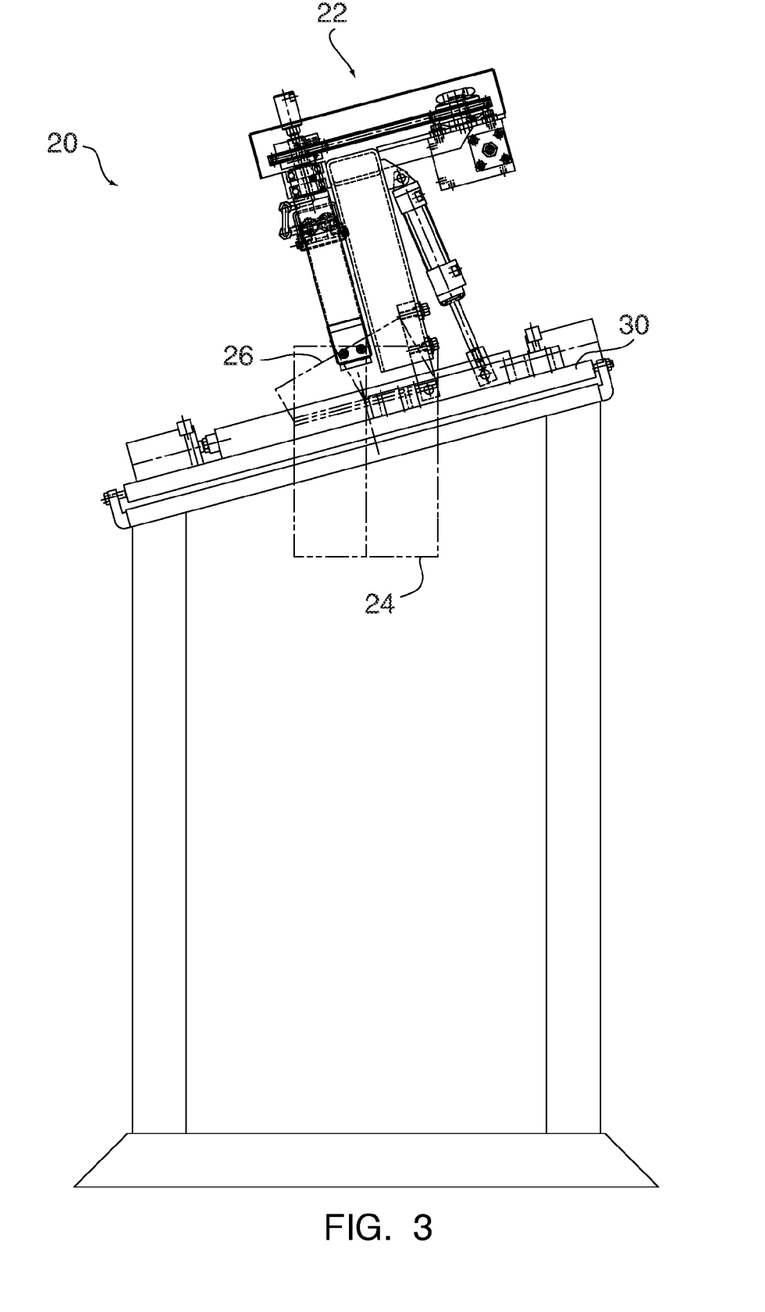
FIG. 3 is partial cross-sectional view of an elbow machine having an elbow rotator, wherein the elbow workpiece is in a first position, according to one embodiment of the present invention.
Figure 4:
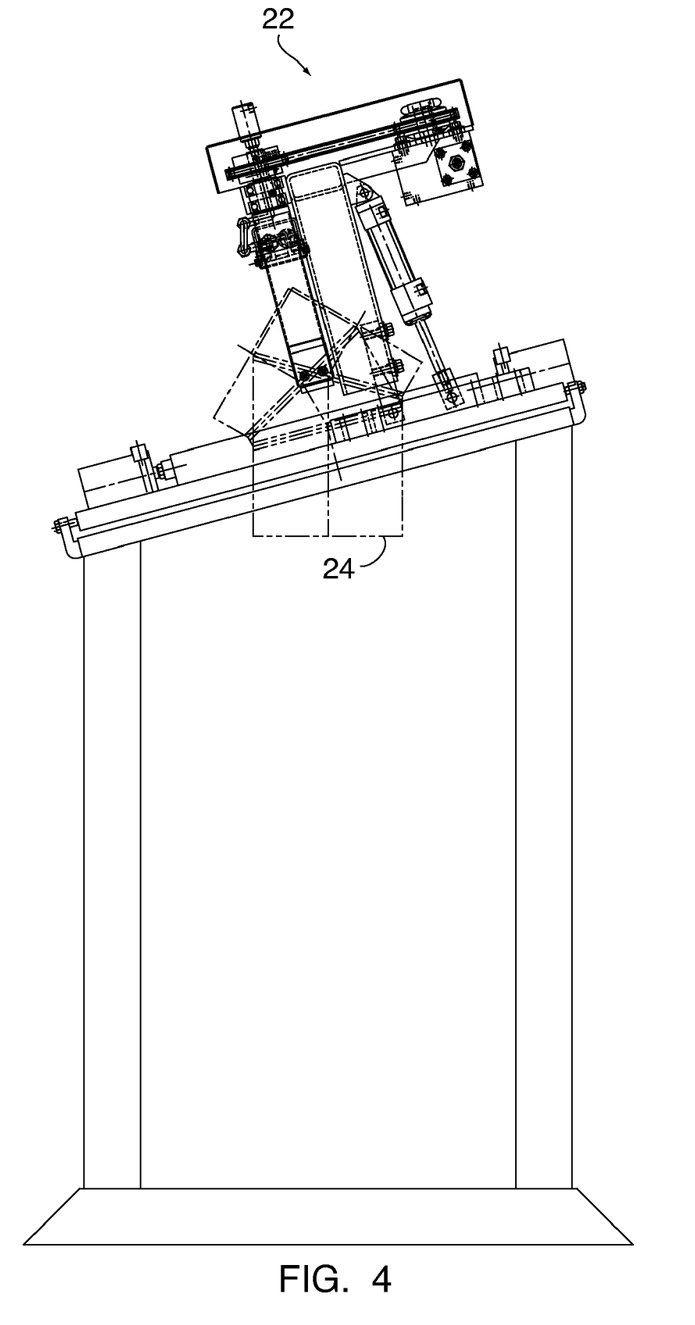
FIG. 4 is partial cross-sectional view of an elbow machine having an elbow rotator, wherein the elbow workpiece is in a second position, according to one embodiment of the present invention.
Figure 5:
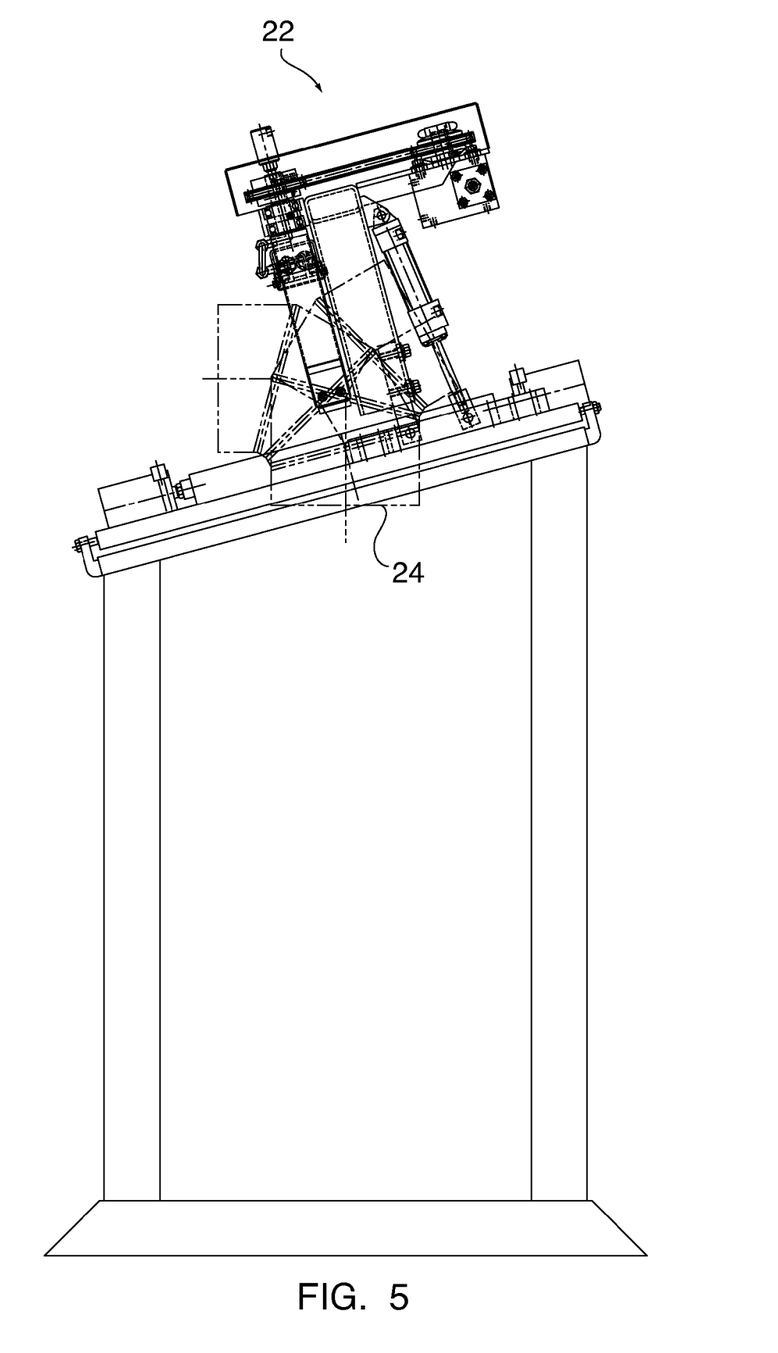
FIG. 5 is partial cross-sectional view of an elbow machine having an elbow rotator, wherein the elbow workpiece is in a finished position, according to one embodiment of the present invention.
Figure 6:
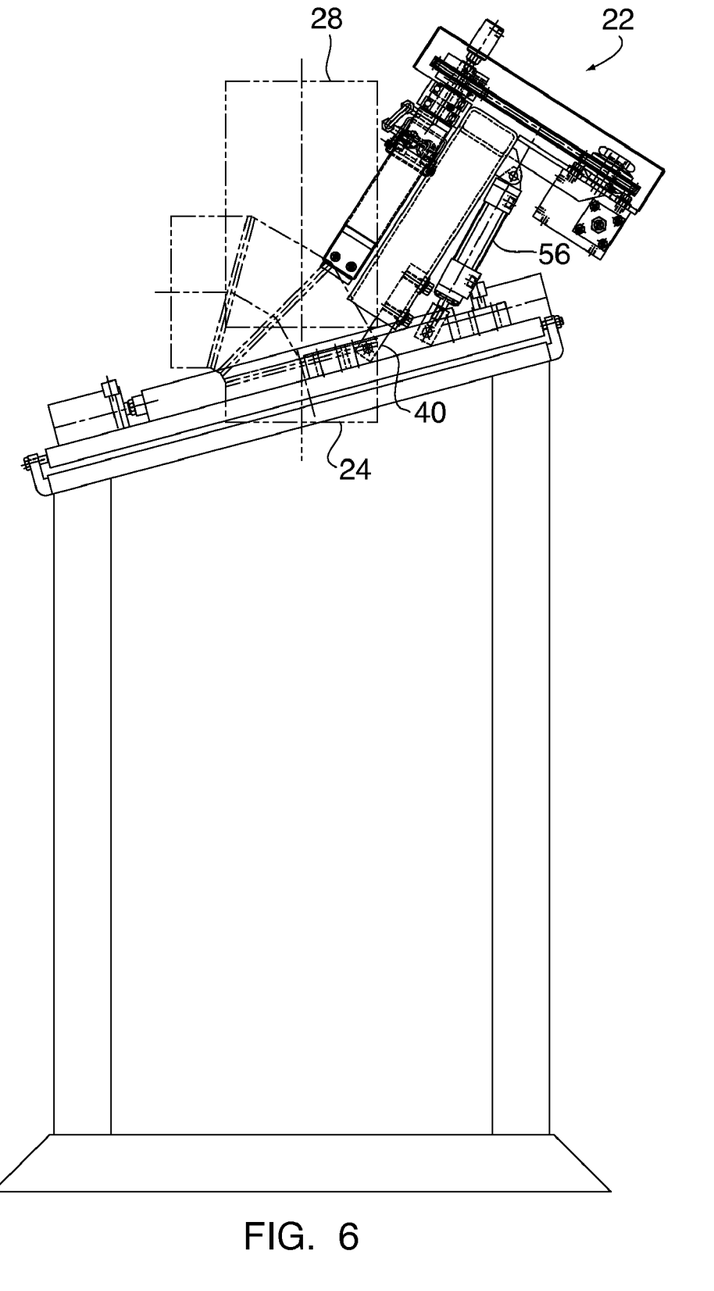
FIG. 6 is partial cross-sectional view of an elbow machine having an elbow rotator, wherein the elbow rotator is tilted back to permit removal of the finished elbow unit, according to one embodiment of the present invention.

FIG. 3 illustrates an elbow machine 20 equipped with an elbow rotator 22 of the present invention. As shown in FIG. 3, an elbow workpiece 24 is mounted within the elbow machine 20 after the elbow workpiece 24 has been formed by the elbow machine 20 in accordance with a known process. A first section 26 of the elbow workpiece 24 is then rotated by the elbow rotator 22, as shown in FIG. 3, in a manner to be explained shortly. FIGS. 4 and 5 illustrate the subsequent rotation, and corresponding re-orientation, of additional sections of the elbow workpiece 24 by the elbow rotator 22. FIG. 6 illustrates the finished elbow workpiece 24 and, in phantom, a new elbow workpiece 28 being mounted for similar processing.

Figure 7:
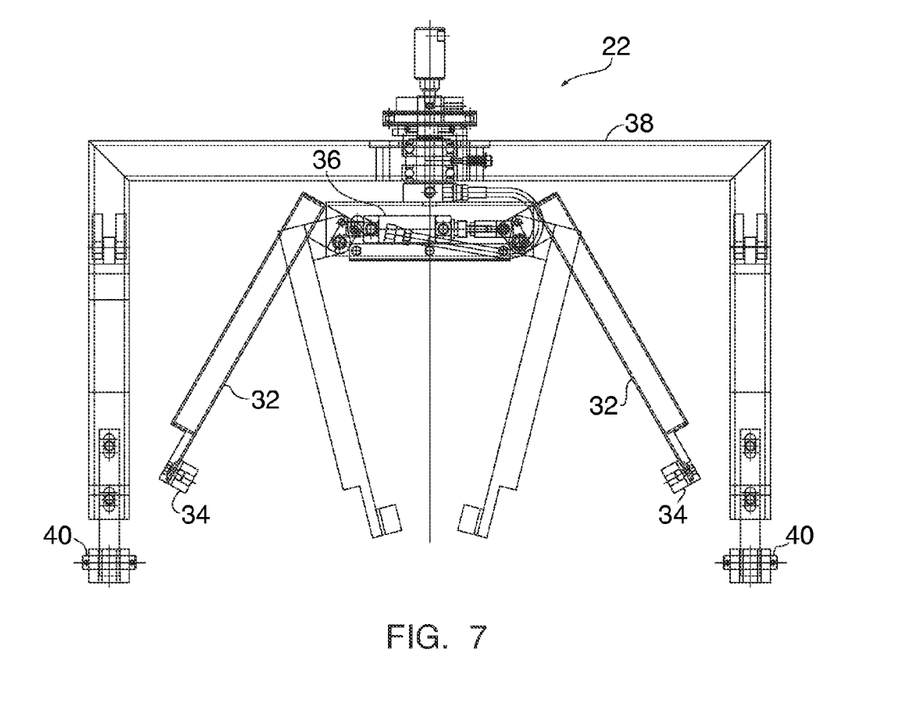
FIG. 7 is a front, partial cross-sectional view of the elbow rotator of the present invention.

The elbow rotator 22 is preferably mounted on an inclined work surface 30 of the elbow machine 20 so as to accept and automatically manipulate each section of the elbow workpiece 24 as each joint of the elbow workpiece 24 is formed by the elbow machine 20. FIG. 7 is a front, partial cross sectional view of the elbow rotator 22. As shown in FIG. 7, the elbow rotator 22 includes a pair of gripping arms 32 having flexible, resilient pads 34 disposed on the ends thereof. A hydraulic cylinder 36, or the like, is utilized to close the gripping arms 32 about a lead section of the elbow workpiece 24. As will be appreciated, the gripping arms 32 will grip the elbow workpiece 24 with a force commensurate with the hydraulic pressure applied to the cylinder 36. Moreover, the cylinder 36 is disposed between the gripping arms 32 and does not control the position of the gripping arms 32, which will center themselves about and on the elbow workpiece 24 as the elbow workpiece is being rotated. As is also shown in FIG. 7, a frame 38 is rotatably mounted on the inclined work surface 30 about pivot joints 40 and substantially supports elbow rotator 22.

It will be readily appreciated that while hydraulic cylinders have been discussed in connection with the present invention, other alternative designs, such as but not limited to pneumatic systems, may be utilized without departing from the broader aspects of the present invention.

Figure 8:
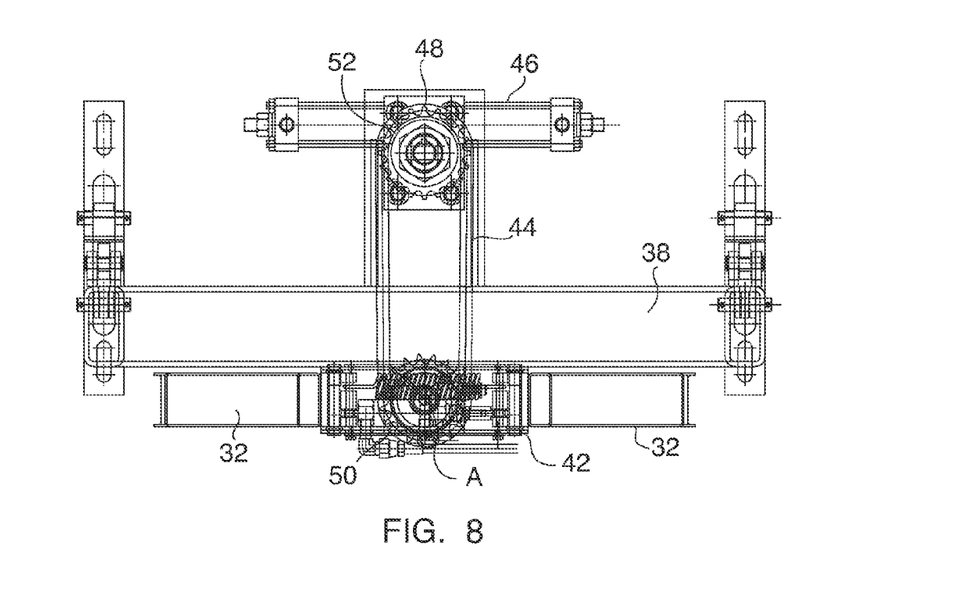
FIG. 8 is a top, partial cross-sectional view of the elbow rotator of the present invention.

FIG. 8 illustrates a top, partial cross-sectional view of the elbow rotator 22. As seen in FIG. 8, the gripping arms 32 are mounted to a gripping frame 42 which selectively pivots about an axis A that is substantially perpendicular to the plane of the joint and is centered on the axis of the joint. The gripping frame 42 is rotated by a roller chain 44 driven by a rotary actuator 46. The rotary actuator 46 will selectively cause the frame 42 and gripping arms 32 to rotate approximately 180°. A sprocket 48 is located on the rotary actuator 46 and includes more teeth than a similar sprocket 50 located on the frame 42 in order to provide rotation of more than 180°, should such a rotation be desired. Stroke limiters are utilized on the rotary actuator 46 to adjust the amount of rotation that is produced. Moreover, an adjustable torque limiter 52 is utilized in conjunction with the rotary actuator 46 to limit the available torque that will rotate the elbow workpiece 24.

In operation, each section 12 of the elbow workpiece 24 is sequentially gripped by the gripping arms 32 and rotated approximately 180° under the direction of the rotary actuator 46. After each section 12 of the elbow workpiece 24 has been rotated, the rotary actuator 46 is returned to its home position. The gripper frame 42 rotates back by only the amount over 180° that a given section 12 of the elbow workpiece 24 may have been rotated. In such instances, the gripper frame 42 is stopped by a ratchet and pawl wheel assembly 54 (seen in FIG. 9) at the 180° position, while torque limiter 52 slips to allow the rotary actuator 46 to continue rotating to its home position. In this manner, each successive section 12 of the elbow workpiece 24 may be rotated in the same direction and, moreover, the direction of rotation may be easily reversed by changing the configuration of the ratchet and pawl assembly 54 and reversing the home position of the rotary actuator 46. In this regard, there is a preferred direction to rotate the sections 12 of the elbow workpiece 24 depending on which direction the seam 14 is lapped so that the seam 14 will not catch. In order to achieve proper positioning, it may also be necessary to rotate the first section 12 of the elbow workpiece 24 more than 180°, as the first section 12 of the elbow workpiece 24 may have been slightly rotated during formation of the joints 16.

Figure 9:
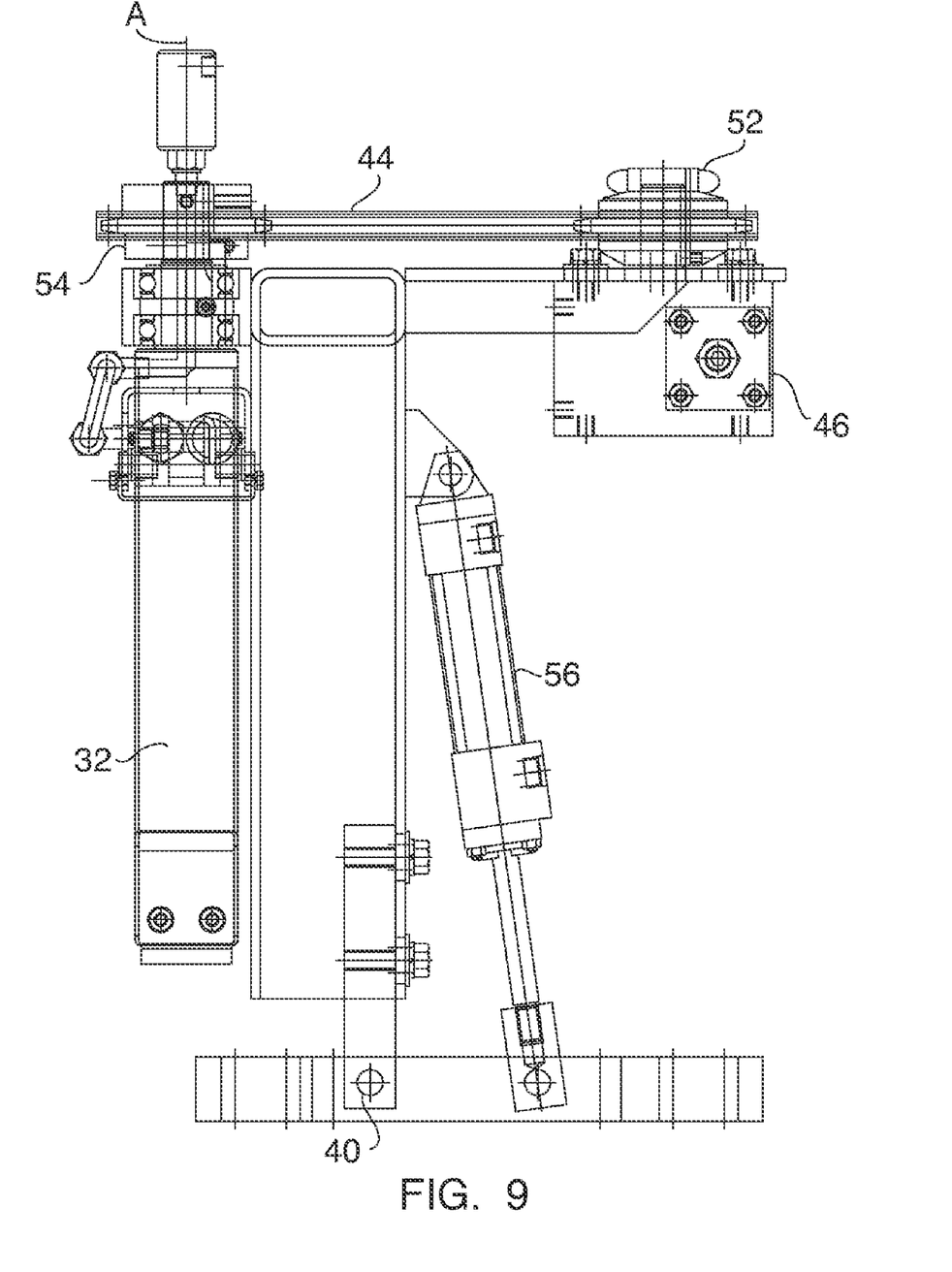
FIG. 9 is a side, partial cross-sectional view of the elbow rotator of the present invention.

FIG. 9 illustrates a side, partial cross-sectional view of the elbow rotator 22. As seen in FIG. 9, the elbow rotator 22 includes a hydraulic positioning cylinder 56 which selectively causes the elbow rotator 22 to pivot about pivot joints 40. Indeed, as best seen with reference to FIGS. 9 and 6, the frame 38 along with the gripping arms 32 and rotary actuator 46 may be selectively tipped back at the conclusion of each elbow production cycle (the position illustrated in FIG. 6) so as to provide enough clearance to remove the finished elbow from the elbow machine 20 and insert the new elbow workpiece 28. The frame 38 would then be tilted back to its operative position to ready for the next elbow production cycle.

It will be readily appreciated that the elbow rotator 22 of the present invention may automatically and sequentially rotate differing sections of a formed elbow workpiece to their proper orientation without the need for manual manipulation of the same. The production of finished elbow units may therefore be substantially increased as compared to manual production methods currently in use. Moreover, given that the elbow rotator 22 resets to a known 'home position' prior to each rotation, and further, that the elbow rotator 22 may even compensate for the slight rotation of the first section of the elbow workpiece, the present invention is capable of repetitively producing finished elbow units having substantially uniform characteristics and mechanical tolerances.

While FIGS. 3-9 illustrate the elbow rotator 22 being integrated with the elbow formation machine 20, the present invention is not limited in this regard. Indeed, the present invention contemplates a free standing elbow rotator apparatus that is not integrated with another device or apparatus, rather it may be a wholly separate unit for accomplishing the same general task as the elbow rotator 22, discussed above.

Figure 10:
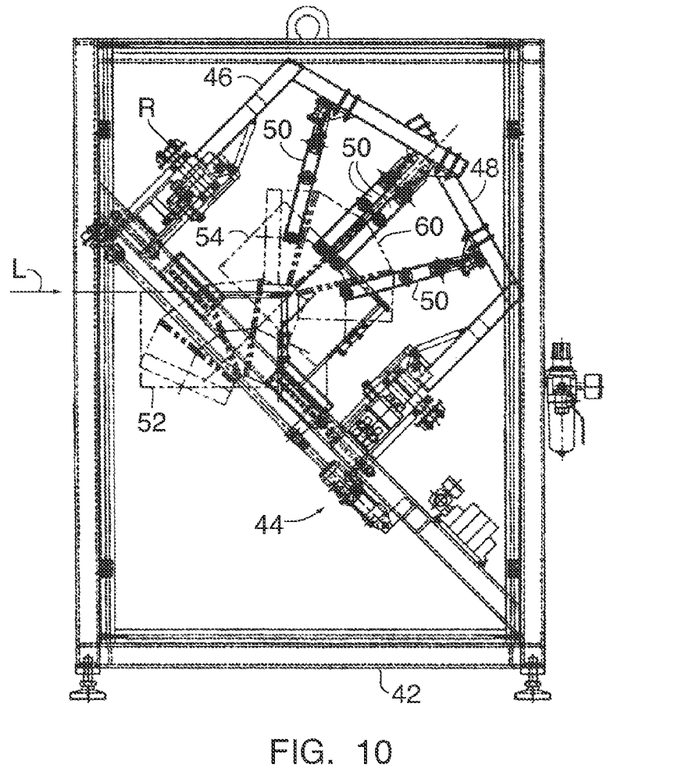
FIG. 10 is partial cross-sectional side view of a free standing elbow rotator, according to another embodiment of the present invention.

FIG. 10 illustrates a partial cross-sectional side view of a free standing elbow rotator 40, in accordance with another embodiment of the present invention. As shown in FIG. 10, the free standing elbow rotator 40 includes a housing 42 and an inclined work surface 44 contained therein.

As discussed previously, adjustable elbows workpieces are initially manufactured as straight tubes having a series of integrated sections. After an elbow machine has finished making the joints in the elbow workpiece, it is still in a straight shape (as seen in FIG. 1). The elbow workpiece must then be rotated into its angled configuration and joined together with other elbows to form a "donut". This donut arrangement is the preferred method of shipping elbows for many manufacturers.

A 90 degree elbow consists of four sections 12, such as shown in FIG. 2. As mentioned previously, each section 12 must be rotated approximately 180 degrees relative to the adjacent sections 12 to position the elbow in its 90 degree shape. There are other elbow configurations that have fewer sections and may result in different angles of the rotated elbow, but all typically require the 180 degree rotation of the adjacent sections in order to produce a finished, or completed, elbow configuration.

Returning to FIG. 10, the free standing elbow rotator 40 further includes a pair of gripping arms 46 and 48. Each of the gripping arms 46 and 48 support several pairs of gripping fingers 50 and are oriented for selective rotation about rotational axis R. In operation, the gripping fingers 50 of the gripping arms 46 and 48 will selectively secure about each section 12 of the elbow workpiece and rotate them to their finished orientation, as will be described in more detail hereinafter. While the free standing elbow rotator 40 has been described as having several pairs of gripping fingers 50 for each of the gripping arms 46/48, the present invention is not limited in this regard as the gripping arms 46/48 may alternatively support any number of pairs of gripping fingers 50, inclusive of a single pair, without departing from the broader aspects of the present invention.

It is therefore an important aspect of the present invention that one pair of the gripping fingers 50 will rotate each of the sections 12 so that all of the sections 12 can be turned at the same time. In this manner, the free standing elbow rotator 40 of the present invention serves to significantly reduce the manufacturing time of elbow workpieces, especially as contrasted with the previously known manual rotation of the sections 12 of the elbow workpiece.

As further shown in FIG. 10, and with the gripping arms 46 and 48 in their 'up' position, an operator will load a straight elbow workpiece 52 into the free standing elbow rotator 40, from the front and substantially in a direction L. The straight elbow workpiece 52 is preferably loaded so as to ensure that the seam 14 is up and the crimped end out.

Figure 11:
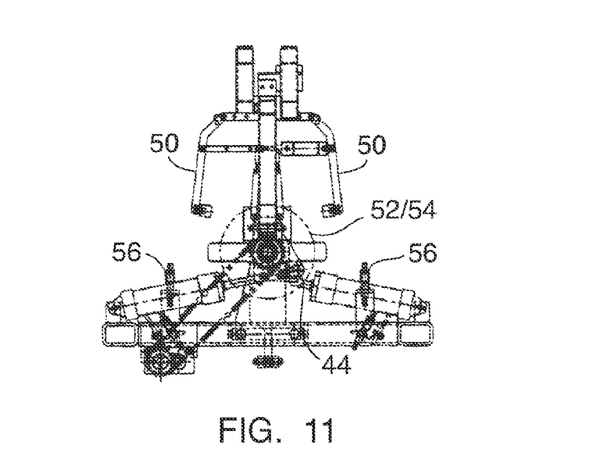
FIG. 11 is a partial cross-sectional end view of a gripping arm of the free standing elbow rotator in its 'up' position.

Once a start button is pushed, the straight elbow workpiece 52 is swung up to re-position the straight elbow workpiece 52 at a second, inclined position 54 within the free standing elbow rotator 40. Thus, the longitudinal axis of the straight elbow workpiece 52/54 will be arranged to be substantially parallel to, and preferably concentrically aligned with, the rotational axis R of the gripping arms 46 and 48. FIG. 11 is a partial cross-sectional view of the straight elbow workpiece 52/54 as it is arranged within the free standing elbow rotator 40 with the gripping arms 46 and 48, and gripping fingers 50, in their 'up' position.

A cam and roller arrangement permits each of the gripping arms 46 and 48 to pivot as they rotate down. As each of the gripping arms 46 and 48 reach their 'down' position, each of the gripping fingers 50 will contact an adjustable stop 56 to arrest each of the gripping fingers 50 in the proper starting position to grip the sections 12. The stops 56 are manually adjustable to produce the correct amount of rotation to each of the sections 12.

Figure 12:
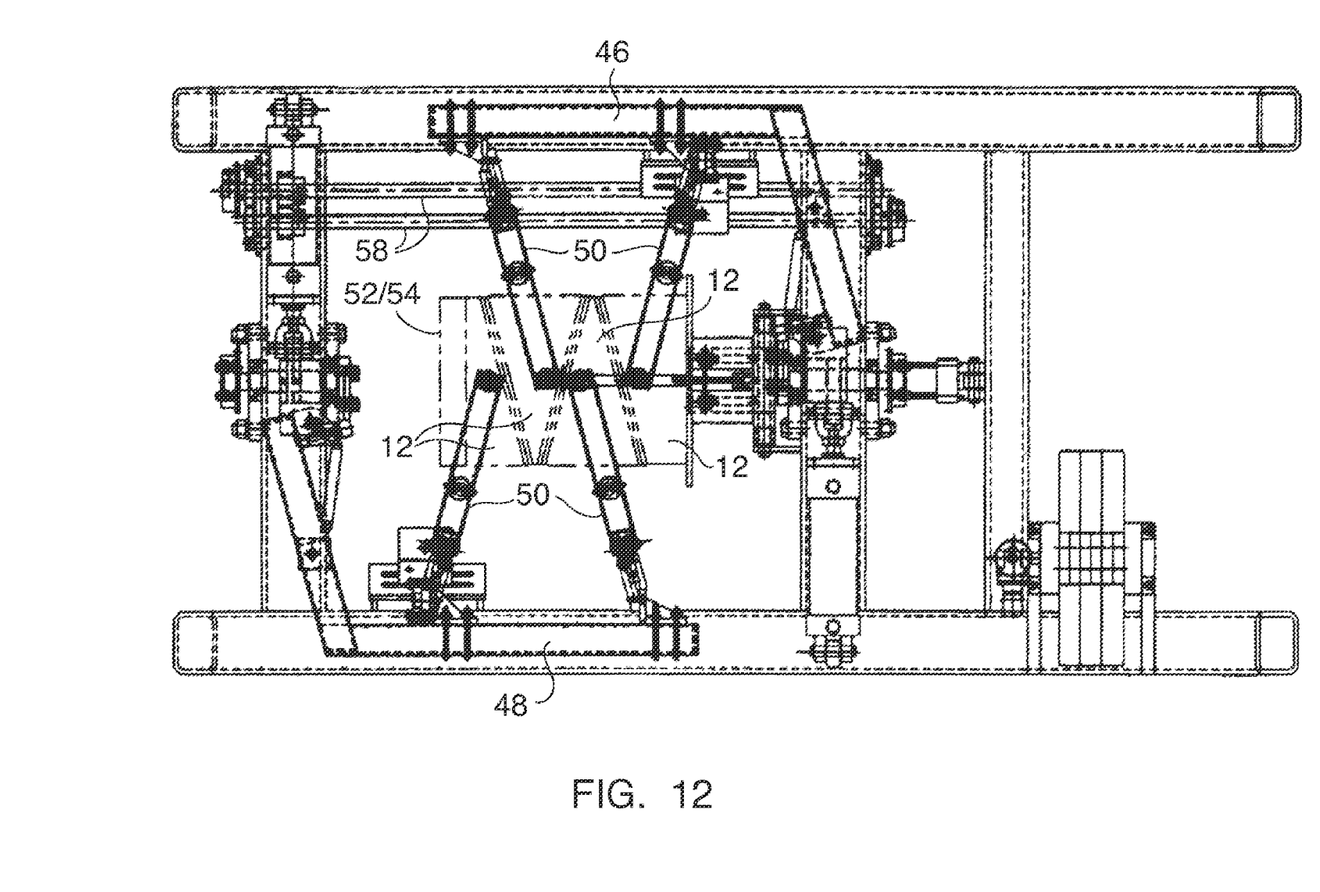
FIG. 12 is a partial cross-sectional top view of the gripping arms of the free standing elbow rotator in their 'down' position and secured about their respective sections of the elbow workpiece.

With the gripping arms 46 and 48 in their 'down' position, the gripping arms 50 are caused to close about each section 12 of the elbow workpiece 52/54. As shown in FIG. 12, the gripping fingers 50 of adjacent sections 12 are connected to gripping arms 46 and 48. That is, on a four-section elbow workpiece, the first and third section gripping fingers 50 are mounted on one gripping arm, and the second and fourth section gripping fingers 50 are mounted on the other gripping arm. FIG. 12 illustrates the free standing elbow rotator 40 when the gripping arms 46 and 48 are in their 'down' position, and the gripping fingers 50 are each secured about their respective sections 12 of the elbow workpiece 52/54.

Figure 13:
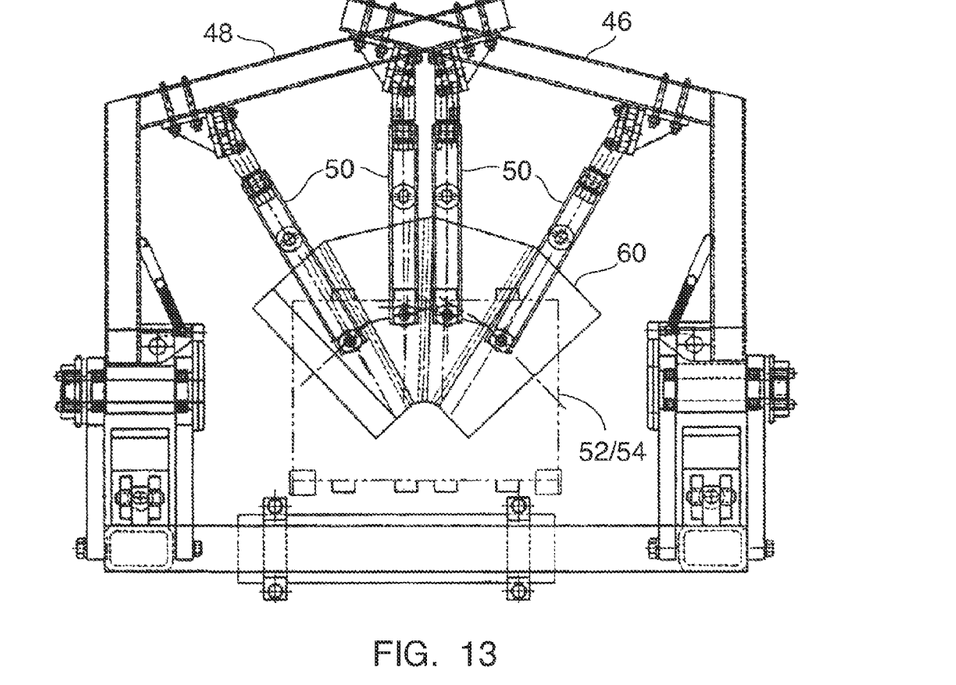
FIG. 13 is a partial cross-sectional side view of the gripping arms of the free standing elbow rotator after rotation back to their 'up' position, thereby forming a completed elbow.

After gripping each of the sections 12, one gripping arm rotates 90 degrees clockwise while the other gripping arm rotates approximately 90 degrees counterclockwise. As the arms rotate, they swing out approximately 15 degrees to follow the arching movement of the elbow workpiece 52/54. Each set of the gripping fingers 50 is mounted to the gripping arms 46 and 48 by a pivoted joint so the gripping fingers 50 may twist with the elbow workpiece 52/54 as it is rotated. The rotations of the two gripping arms 46/48 are synchronized by a chain and sprocket assembly and operatively connected to two shafts 58 that are geared together, as shown in FIG. 12. The rotation of the gripping arms 46 and 48 thereby causes the individual sections 12 of the elbow workpiece 52/54 to rotate to their final position and thus define a completed elbow 60. FIG. 13 illustrates a side, partial cross-sectional view of the completed elbow workpiece 60 once the gripping arms 50 have completed their upwards rotation.

Once the gripping arms 46 and 48 have been fully rotated to occupy once again their 'up' position, as shown in FIG. 13, the gripping fingers 50 release the completed elbow 60. The completed elbow 60 is then pivoted, in opposition to the direction in which it was initially loaded, for subsequent removal from the housing 42 of the free standing elbow rotator 40.

Figure 14:
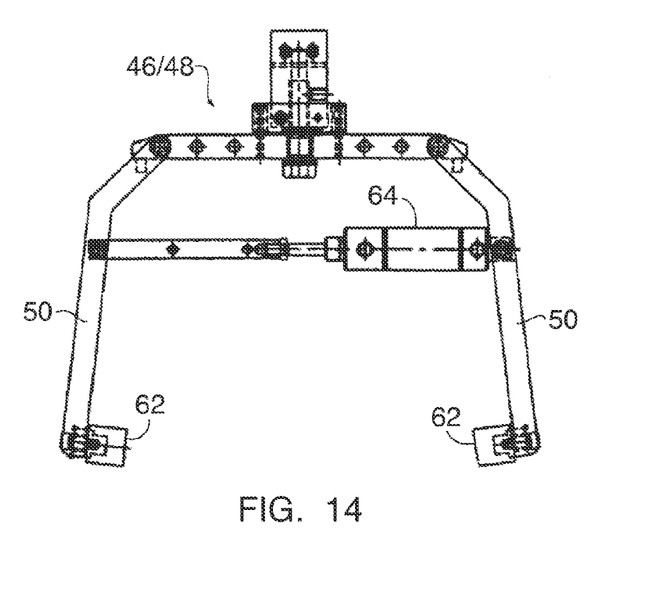
FIG. 14 is a partial cross-sectional end view of a gripping arm of the free standing elbow rotator.

FIG. 14 illustrates an end view of one set of the gripping fingers 50 attached to one of the gripping arms 46/48. As shown in FIG. 14, the distal ends of the gripping fingers are each equipped with a resilient and elastic cushioning bumper 62, such as but not limited to a urethane bumper or the like, for protecting the body of the elbow workpiece 52/54 during operation of the free standing elbow rotator 40. A pneumatic cylinder 64, or the like, is utilized to selective cause the gripping fingers 50 to alternatively expand and constrict about the body of the elbow workpiece 52/54.

Figure 15A:
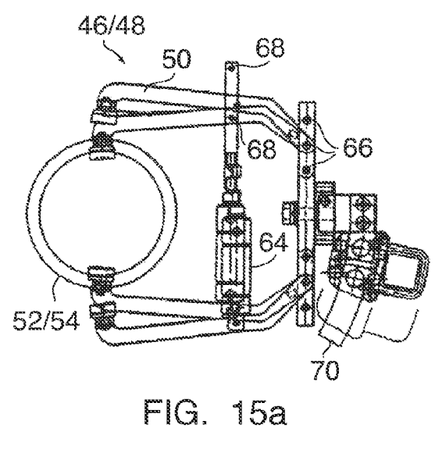
FIG. 15 illustrate the gripping arm of FIG. 14 as it accommodates elbow workpieces of differing diameters.
Figure 15B:
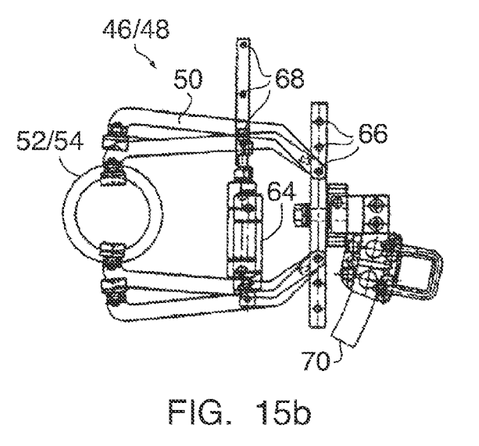
Figure 16:
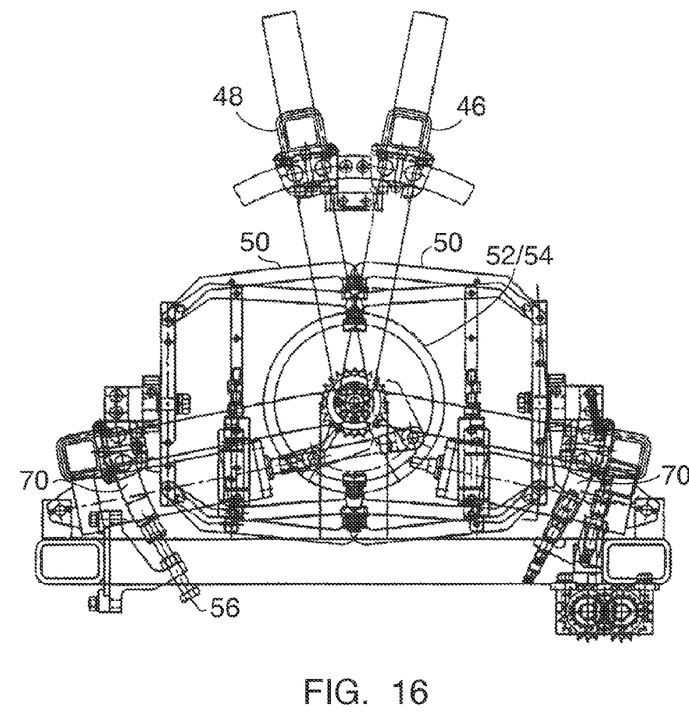
FIG. 16 is a partial cross-sectional end view of the gripping arms of the free standing elbow rotator in both its 'up' and 'down' positions.

Moreover, as shown in FIG. 15, the gripping fingers 50 of the gripping arms 46/48 may be selectively configured to match elbow workpieces 52/54 of differing diameters. That is, by changing the attachment points 66 of the gripping fingers 50 on the gripping arm 46/48, as well as by changing the attachment points 68 of the gripping fingers 50 to the cylinder 64 itself, it is thus possible to accurately accommodate elbow workpieces 52/54 of differing diameters. As discussed hereinafter, at least one of the gripping arms 46/48 also includes a sliding bar 70 which may be selectively positioned, via friction bolts or the like, to extend a predetermined distance, thus selectively abutting adjustable stop 56 and arresting thereby the rotation of the gripping arms 46/48 during its downward rotation, as illustrated in FIG. 16.

It will be readily appreciated that when the elbow joints 16 (shown in FIG. 1) are formed in an elbow machine, the sections 12 are usually rotated slightly out of alignment with respect to one another. Each section 12 must therefore be rotated a different amount to have the proper alignment at the end of the rotation. As discussed above, the present invention envisions that one pair of gripping fingers 50 on each gripping arm 46/48 is mounted on a sliding bar 70 so that it may be stopped before the gripping arm 46/48 is fully rotated down. When the gripping arm 46/48 is rotated down, it is stopped at a different starting position to match the starting position of its respective elbow section 12. The gripping arm 50 is therefore stopped at the position for the sliding gripping fingers 50 to match the starting position of its respective elbow section 12. As the gripping arm 46/48 rotates up, only those sections 12 gripped by the fixed gripping fingers 50 are initially rotated, until the gripping arm 46/48 reaches the position that the sliding gripping fingers 50 was stopped. As the rotation continues, the sliding gripping fingers 50, along with the fixed gripping fingers 50, now also rotate their respective sections 12 through the rest of the rotation. At the end of the arm rotation each section 12 is therefore in its proper, final position.

It will therefore be appreciated that the present invention provides a rotator for elbow workpieces which automatically performs the rotation of respective sections of the elbow workpiece, thereby automating what has traditionally been a laborious, difficult and time consuming process. Moreover, the present invention has envisioned that the elbow rotator may be provided in conjunction with an elbow forming machine, thus rotating each section of the elbow workpiece as it is formed, or alternatively, that a free standing elbow rotator may be utilized for simultaneously accomplishing rotation of all of the sections of an elbow workpiece after it has been formed.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. An elbow rotator apparatus for rotating an integrally formed section of an elbow workpiece, said elbow rotator apparatus comprising:
   a pair of gripping arms which are selectively positionable in a first position displaced from said elbow workpiece, and a second position in which said gripping arms are in contact with said integral section of said elbow workpiece;
   a rotary actuator operatively connected to said gripping arms, said rotary actuator selectively rotating said gripping arms;
   a frame operatively connected to said gripping arms and said rotary actuator, said frame being pivotable about a pivot axis;
   a pivoting device for selectively pivoting said frame about said pivot axis; and
   wherein when said gripping arms are in said second position and secured about said integral section, said rotary actuator will rotate said gripping arms by a predetermined amount, thus rotating said integral section.

2. The elbow rotator apparatus according to claim 1, further comprising:
   one of a hydraulic cylinder and a pneumatic cylinder operatively connected to said gripping arms for alternatively positioning said gripping arms in said first position and said second position.

3. The elbow rotator apparatus according to claim 1, wherein:
   said gripping arms each include a resilient pad disposed on a distal end thereof.

4. The elbow rotator apparatus according to claim 1, further comprising:
   an adjustable torque limiter operatively connected to said rotary actuator for selectively adjusting a torque at which said gripping arms are rotated.

5. The elbow rotator apparatus according to claim 1, wherein:
   said rotary actuator is rotatable in opposing directions.

6. The elbow rotator apparatus according to claim 1, wherein:
   said pivoting device is one of a hydraulic cylinder and a pneumatic cylinder; and
   said frame is pivotable from a first placement where said gripping arms are actuated to rotate said integral section, to a second placement spaced from and at an angle to said first placement.

7. The elbow rotator apparatus according to claim 6, further comprising:
   an elbow forming apparatus for forming said integral section in said elbow workpiece; and
   wherein said frame is mounted upon said elbow forming apparatus.

8. The elbow rotator apparatus according to claim 7, wherein:
   said elbow forming apparatus includes an inclined work surface having an aperture formed therein, said elbow workpiece passing through said aperture to extend above said inclined work surface;
   said gripping arms are disposed substantially above said aperture when said frame is in said first placement; and
   said gripping arms are pivoted away from said aperture when said frame is in said second placement, thus allowing for removal of said elbow workpiece from said aperture.

9. The elbow rotator apparatus according to claim 1, wherein:
   said predetermined amount is approximately 180°.

10. An elbow rotator apparatus for rotating integrally formed sections of an elbow workpiece, said elbow rotator apparatus comprising:
    a first gripping arm selectively rotatable about a rotational axis;
    a second gripping arm selectively rotatable about said rotational axis, said first gripping arm and said second gripping arm being selectively rotatable between a first position and a second position;
    a first pair of gripping fingers operatively connected to said first gripping arm;
    a second pair of gripping fingers operatively connected to said second gripping arm, said first pair of gripping fingers and said second pair of gripping fingers selectively clamping upon said integrally formed sections of said elbow workpiece; and
    wherein said integrally formed sections are simultaneously rotated by a predetermined amount when said first pair of gripping fingers and said second pair of gripping fingers are adapted to clamp about said integrally formed sections and said first and said second gripping arms are selectively rotated between said first and said second positions.

11. The elbow rotator apparatus according to claim 10, wherein:
    said first gripping arm is operatively connected to a first plurality of pairs of gripping fingers;
    said second gripping arm is operatively connected to a second plurality of pairs of gripping fingers; and
    wherein said first plurality of pairs of gripping fingers and said second plurality of pairs of gripping fingers are adapted to clamp around alternating sections of said integrally formed sections of said elbow woekpiece.

12. The elbow rotator apparatus according to claim 11, wherein:
    at least one of said first plurality of pairs of gripping fingers includes an adjustable arresting bar for selectively arresting a distance that said at least one of said first plurality of pairs of gripping fingers is rotated during rotation of said first gripping arm; and at least one of said second plurality of pairs of gripping fingers includes an adjustable arresting bar for selectively arresting a distance that said at least one of said second plurality of pairs of gripping fingers is rotated during rotation of said second gripping arm.

13. The elbow rotator apparatus according to claim 10, wherein:

said first gripping arm and said second gripping arm rotate in opposing directions about said rotational axis.

14. The elbow rotator apparatus according to claim 10, wherein:

said first gripping arm and said second gripping arm each include an adjustment mechanism for adjusting a dimension between said first pair of gripping fingers and said second pair of gripping fingers when said first and said second pair of gripping fingers are clamped about said integrally formed sections.

15. The elbow rotator apparatus according to claim 10, further comprising:

one of a hydraulic cylinder and a pneumatic cylinder operatively connected to said first pair of gripping fingers and said second pair of gripping fingers for selectively causing said first and said second pairs of gripping fingers to clamp upon said integrally formed sections.

16. The elbow rotator apparatus according to claim 15, wherein:

said first and said second pairs of gripping fingers each include a compressible pad disposed on a distal end thereof.

17. The elbow rotator apparatus according to claim 10, further comprising:

a housing for enclosing said elbow rotator apparatus, said housing includes an inclined work surface;

said first and said second gripping arms are mounted upon said inclined work surface; and said rotational axis is substantially parallel to said inclined work surface.

18. A method for simultaneously rotating integrally formed sections of a straight elbow workpiece, said method comprising the steps of:

mounting a first gripping arm to be selectively rotatable about a rotational axis;

mounting a second gripping arm to be selectively rotatable about said rotational axis, said first gripping arm and said second gripping arm being selectively rotatable between a first position and a second position;

operatively connecting a first pair of gripping fingers to said first gripping arm;

operatively connecting a second pair of gripping fingers to said second gripping arm;

selectively clamping said first pair of gripping fingers and said second pair of gripping fingers about said integrally formed sections of said elbow workpiece; and rotating said first gripping arm and said second gripping arm about said rotational axis between said first position and said second position, thereby simultaneously rotating said clamped integrally formed sections by a predetermined amount.

19. The method for simultaneously rotating integrally formed sections of a straight elbow workpiece according to claim 18, said method further comprising the steps of:

operatively connecting said first gripping arm to a first plurality of pairs of gripping fingers;

operatively connecting said second gripping arm to a second plurality of pairs of gripping fingers;

clamping said first plurality of pairs of gripping fingers and said second plurality of pairs of gripping fingers around alternating sections of said integrally formed sections of said elbow woekpiece; and rotating said first gripping arm and said second gripping arm in opposing directions about said rotational axis.

* * * * *